United States Patent
Zhou et al.

(10) Patent No.: US 11,947,831 B2
(45) Date of Patent: Apr. 2, 2024

(54) ADAPTIVE ENHANCED CORRECTIVE READ BASED ON WRITE AND READ TEMPERATURE

(71) Applicant: MICRON TECHNOLOGY, INC., Boise, ID (US)

(72) Inventors: Zhenming Zhou, San Jose, CA (US); Murong Lang, San Jose, CA (US); Ching-Huang Lu, Fremont, CA (US); Nagendra Prasad Ganesh Rao, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/830,625

(22) Filed: Jun. 2, 2022

(65) Prior Publication Data

US 2023/0393776 A1    Dec. 7, 2023

(51) Int. Cl.
*G06F 3/06* (2006.01)

(52) U.S. Cl.
CPC .......... *G06F 3/0655* (2013.01); *G06F 3/0604* (2013.01); *G06F 3/0652* (2013.01); *G06F 3/0679* (2013.01)

(58) Field of Classification Search
CPC .... G06F 3/0604; G06F 3/0652; G06F 3/0655; G06F 3/0679
See application file for complete search history.

(56) References Cited

U.S. PATENT DOCUMENTS

| | | | | |
|---|---|---|---|---|
| 6,028,794 A | * | 2/2000 | Nakai | G11C 16/3495 365/185.11 |
| 9,672,940 B1 | * | 6/2017 | Reusswig | G11C 11/5628 |

\* cited by examiner

*Primary Examiner* — Larry T MacKall
(74) *Attorney, Agent, or Firm* — Lowenstein Sandler LLP

(57) ABSTRACT

A system includes a memory device and a processing device, operatively coupled with the memory device, to perform operations including: receiving a request to perform a read operation on a segment of the memory device; determining a program erase cycle count associated with the segment of the memory device; determining a temperature offset value for the segment of the memory device based on a write temperature and a read temperature, determining whether the temperature offset value satisfies a threshold criterion associated with the program erase cycle count of the segment; and responsive to determining that the temperature offset value satisfies the threshold criterion, performing a corrective read operation on the segment of the memory device, wherein a sense time parameter of the corrective read operation is modified according to the temperature offset value and the program erase cycle count.

20 Claims, 8 Drawing Sheets

400A

| PEC | Threshold |
|---|---|
| A1 | T1 |
| A2 | T2 |
| A3 | T3 |

| PEC | Delta = Twrite - Tread | tSense |
|---|---|---|
| B1 | Delta < T11 | X1 |
| B1 | T11 <= Delta < T12 | X2 |
| B1 | T12 <= Delta < T13 | X3 |
| B1 | T13 <= Delta | X4 |
| B2 | Delta < T21 | Y1 |
| B2 | T21 <= Delta < T22 | Y2 |
| B2 | T22 <= Delta < T23 | Y3 |
| B2 | T23 <= Delta | Y4 |
| B3 | Delta < T31 | Z1 |
| B3 | T31 <= Delta < T32 | Z2 |
| B3 | T32 <= Delta < T33 | Z3 |
| B3 | T33 <= Delta | Z4 |

FIG. 4B

ADAPTIVE ENHANCED CORRECTIVE READ BASED ON WRITE AND READ TEMPERATURE

TECHNICAL FIELD

Embodiments of the disclosure relate generally to memory sub-systems, and more specifically, relate to adaptive enhanced corrective read based on write and read temperature.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIGS. 4A-4B are diagrams of examples of threshold criterions for the adaptive enhanced corrective read, in accordance with some embodiments of the present disclosure.

DETAILED DESCRIPTION

Figure 1:
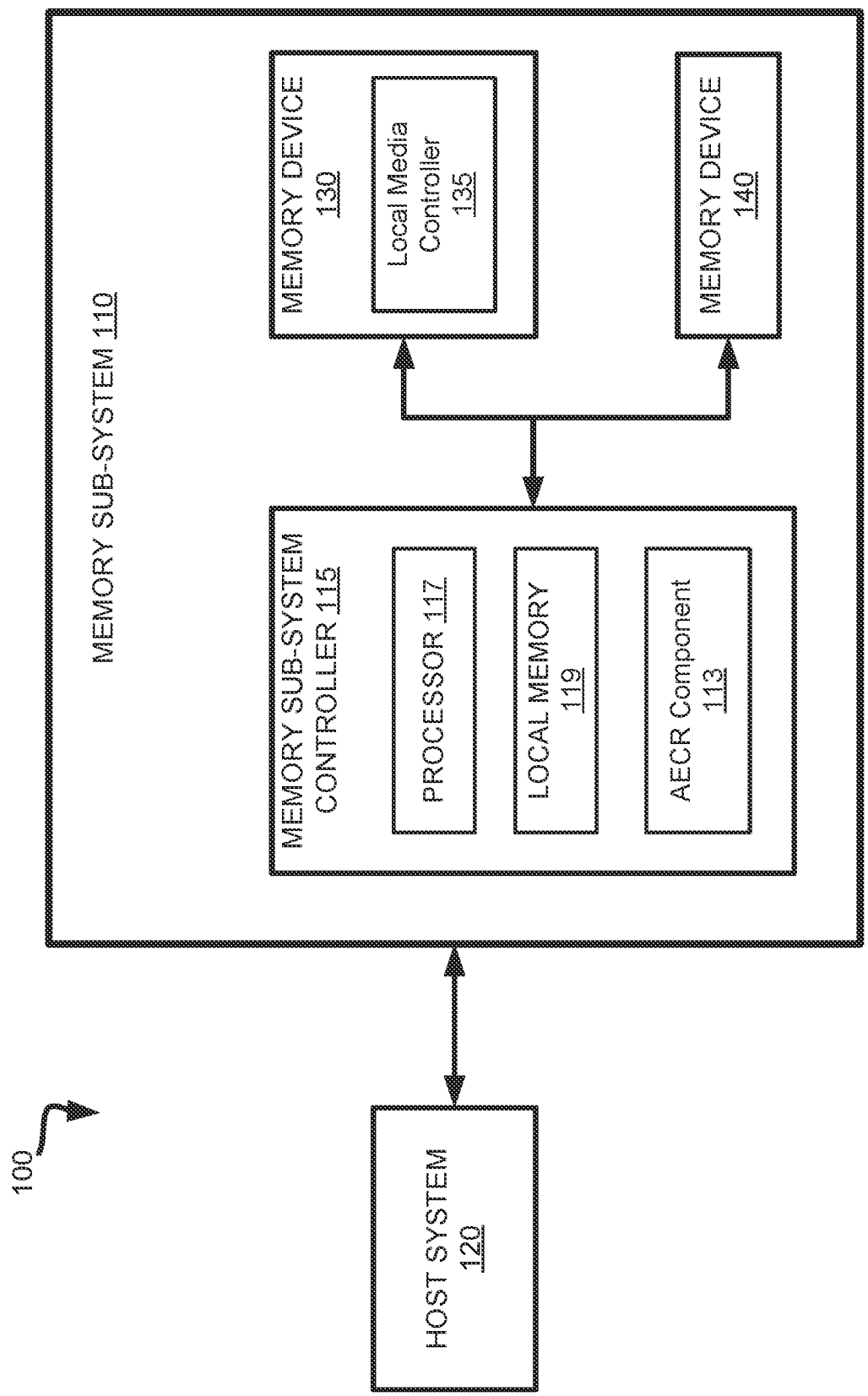
FIG. 1 illustrates an example computing system that includes a memory sub-system, in accordance with some embodiments of the present disclosure.

Aspects of the present disclosure are directed to adaptive enhanced corrective read based on write and read temperature. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die includes one or more planes. For some types of non-volatile memory devices (e.g., NAND devices), each plane includes a set of physical blocks. Each block consists of a set of pages. Each page includes a set of memory cells. A memory cell is an electronic circuit that stores information. Depending on the memory cell type, a memory cell can store one or more bits of binary information, and has various logic states that correlate to the number of bits being stored. The logic states can be represented by binary values, such as "0" and "1", or combinations of such values.

A memory device can include multiple memory cells arranged in a two-dimensional or three-dimensional grid. Memory cells are formed onto a silicon wafer in an array of columns and rows. A memory device can further include conductive lines connected to respective ones of the memory cells, referred to as wordlines and bitlines. A wordline can refer to one or more rows of memory cells of the memory device and a bitline can refer to one or more columns of memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types.

A memory cell ("cell") can be programmed (written to) by applying a certain voltage to the cell, which results in an electric charge being held by the cell. For example, a voltage signal $V_{CG}$ that can be applied to a control electrode of the cell to open the cell to the flow of electric current across the cell, between a source electrode and a drain electrode. More specifically, for each individual cell (having a charge Q stored thereon) there can be a threshold control gate voltage $V_T$ (also referred to as the "threshold voltage") such that the source-drain electric current is low for the control gate voltage ($V_{CG}$) being below the threshold voltage, $V_{CG} < V_T$. The current increases substantially once the control gate voltage has exceeded the threshold voltage, $V_{CG} > V_T$. Because the actual geometry of the electrodes and gates varies from cell to cell, the threshold voltages can be different even for cells implemented on the same die. The cells can, therefore, be characterized by a distribution P of the threshold voltages, $P(Q, V_T) = dW/dV_T$, where dW represents the probability that any given cell has its threshold voltage within the interval $[V_T, V_T + dV_T]$ when charge Q is placed on the cell.

A memory device can exhibit threshold voltage distributions $P(Q, V_T)$ that are narrow compared with the working range of control voltages tolerated by the cells of the device. Accordingly, multiple non-overlapping distributions $P(Q_k, V_T)$ ("valleys") can be fit into the working range allowing for storage and reliable detection of multiple values of the charge $Q_k$, k=1, 2, 3 . . . . The distributions (valleys) are interspersed with voltage intervals ("valley margins") where none (or very few) of the cells of the device have their threshold voltages. Such valley margins can, therefore, be used to separate various charge states $Q_k$—the logical state of the cell can be determined by detecting, during a read operation, between which two valley margins the respective threshold voltage $V_T$ of the cell resides. Specifically, the read operation can be performed by comparing the measured threshold voltage $V_T$ exhibited by the memory cell to one or more reference voltage levels corresponding to known valley margins (e.g., centers of the margins) of the memory device.

One type of cell is a single level cell (SLC), which stores 1 bit per cell and defines 2 logical states ("states") ("1" or "L0" and "0" or "L1") each corresponding to a respective $V_T$ level. For example, the "1" state can be an erased state and the "0" state can be a programmed state (L1). Another type of cell is a multi-level cell (MLC), which stores 2 bits per cell and defines 4 states ("11" or "L0", "10" or "L1", "01" or "L2" and "00" or "L3") each corresponding to a respective $V_T$ level. For example, the "11" state can be an erased state and the "01", "10" and "00" states can each be a respective programmed state. Another type of cell is a triple level cell (TLC), which stores 3 bits per cell and defines 8 states ("111" or "L0", "110" or "L1", "101" or "L2", "100" or "L3", "011" or "L4", "010" or "L5", "001" or "L6", and "000" or "L7") each corresponding to a respective $V_T$ level. For example, the "111" state can be an erased state and each of the other states can be a respective programmed state. Another type of a cell is a quad-level cell (QLC), which stores 4 bits per cell and defines 16 states L0-L15, where L0 corresponds to "1111" and L15 corresponds to "0000". Another type of cell is a penta-level cell (PLC), which stores 5 bits per cell and defines 32 states. Other types of cells are also contemplated. Thus, an n-level cell can use $2^n$ levels of charge to store n bits. A memory device can include one or more arrays of memory cells such as SLCs, MLCs, TLCs, QLCs, PLCs, etc. or any combination of such. For example, a memory device can include an SLC portion, and an MLC portion, a TLC portion, a QLC portion, or a PLC portion of cells.

A valley margin can also be referred to as a read window. For example, in a SLC cell, there is 1 read window that exists with respect to the 2 V t distributions. As another example, in an MLC cell, there are 3 read windows that exist with respect to the 4 V t distributions. As yet another example, in a TLC cell, there are 7 read windows that exist with respect to the 8 V t distributions. Read window size generally decreases as the number of states increases. For example, the 1 read window for the SLC cell may be larger than each of the 3 read windows for the MLC cell, and each of the 3 read windows for the MLC cell may be larger than each of the 7 read windows for the TLC cell, etc. Read window budget (RWB) refers to the cumulative value of the read windows.

Cell-to-cell interference may exist in a memory array between the target cells and their respective groups of adjacent cells. Cell-to-cell interference can lead to lateral charge migration and V t distribution shift. Cell-to-cell interference, in addition to intrinsic charge loss, can further lead to a widening of $V_T$ distributions. The $V_T$ distribution widening can cause RWB degradation, which can negatively affect memory device reliability. For example, RWB degradation can lead to an increase in the number of errors (e.g., bit errors) and/or error rate (e.g., bit error rate (BER)).

One mechanism to compensate for the effects of cell-to-cell interference and/or intrinsic charge loss is corrective read. Generally, a corrective read operation is performed to read each target cell using an appropriate read level offset that accounts for the cell-to-cell inference, lateral charge migration and/or intrinsic charge loss caused by the respective group of adjacent cells. The read level offset can be applied with respect to a center read level. For example, the center read level can be located within a valley between target cell $V_T$ distributions.

To implement a corrective read operation, a controller can, for each group of adjacent cells, obtain cell state information for each cell of the group of adjacent cells. The cell state information for a cell reflects the logical level (e.g., L0-Ln, where n is the total number of logical levels supported) of the cell. For example, if a cell is an SLC cell, the cell state information can reflect whether the cell is in the L0 state or the L1 state. As another example, if the cell is a TLC cell, the cell state information can reflect which of the states L0-L7 that the cell is in. The cell state information for a cell can be obtained by identifying the state of the cell.

To identify the state of the cell, the controller can cause a read voltage to be applied the cell (e.g., gate electrode of the cell) and determine whether the read voltage activates (e.g., turns on) the cell. If the read voltage activates the cell, this indicates that the read voltage is greater than or equal to the $V_T$ of the cell. Additional read voltage(s) may be applied to the cell to determine whether the cell is in a lower state. If the read voltage does not activate the cell, this means that the read voltage is less than the $V_T$ of the cell, and that the cell is in a higher state. Additional read voltage(s) may be applied until the cell is activated. For each group of adjacent cells, the controller can store the cell state information for each cell of the group of adjacent cells in a respective page buffer (e.g., static page buffer). Each page buffer can be connected to a respective group of adjacent cells via a bitline.

In some embodiments, the cell state information for each cell of a group of adjacent cells is 1-bit information. For example, obtaining the 1-bit cell state information can involve applying a single strobe read to each cell of the group of adjacent cells. If the group of adjacent cells includes a single cell (e.g., a cell connected to one of the adjacent wordlines and $WL_{n+1}$), then the stored cell state information is 1 bit in total. The 1-bit stored cell state information can be used to implement 1-bit corrective read (1BCR). If the group of adjacent cells includes a pair of cells (e.g., cells connected to the adjacent wordlines $WL_{n-1}$ and $WL_{n+1}$), then the stored cell state information is 2 bits in total. The 2 bit stored cell state information can be used to implement a "1-bit 2-sided" version of 2-bit corrective read (2BCR).

In some embodiments, the cell state information for each cell of a group of adjacent cells is 2-bit information. For example, obtaining the 2-bit cell state information can involve applying a three strobe read to each cell of the group of adjacent cells. If the group of adjacent cells includes a single adjacent cell (e.g., a cell connected to one of the adjacent wordlines $WL_{n-1}$ and $WL_{n+1}$), then the stored cell state information is 2 bits in total. The 2 bit stored cell state information can be used to implement a "2-bit 1-sided" version of 2BCR. If the group of adjacent cells includes a pair of cells (e.g., cells connected to the adjacent wordlines $WL_{n-1}$ and $WL_{n+1}$), then the stored cell state information is 4 bits in total. The 4 bit stored cell state information can be used to implement 4-bit corrective read (4BCR).

Enhanced corrective read is another corrective read that uses different values for some parameters of normal corrective read, and is specifically targeted for cases of stacking data retention and cross-temperature. However, enhanced corrective read suffers from longer read time, which may cause latency degradation and raise a risk of time out. In conventional systems, corrective read and enhanced corrective read can be turned on or off by a user, for example, in an error handling flow list, and both use default values for certain parameters in a given system. Therefore, conventional systems do not provide adaptive ways to implement corrective read and/or enhanced corrective read.

Bit flip errors can occur in certain memory devices when there is not enough separation between respective threshold voltages (Vt) of two adjacent bit levels (also referred to as "states"), and the level separation in threshold voltages becomes further reduced (or shifted) due to changes in environmental conditions, such as cross-temperature effects. Cross temperature negatively impacts level separation in situations where the memory cell operates (e.g., is read) at a temperature range which is different from a temperature at which the memory cell was programmed. For example, cross temperature effects can arise when data is read from a memory cell at a temperature that is different from the temperature at which data was written into the memory cell. Cross-temperature-induced errors can be accumulated by one or both of shifted levels that cross thresholds boundaries and/or overlapping levels causing increased number of bit flip errors. Bit flip errors reduce reliability and data retention capability as a result of the increased error rate. As the difference between a data write temperature and a data read temperature increases, so does the error rate of the data as a result of level shift and level overlap.

Corrective read as described above can be performed to help with the effects of cell-to-cell interference and lateral charge migration. However, such corrective read has failed to consider the changes in environmental conditions, such as cross-temperature effects.

Aspects of the present disclosure address the above and other deficiencies by implementing adaptive enhanced corrective read in a memory sub-system. Implementing adaptive enhanced corrective read can be used to selectively determine when to perform an enhanced corrective read operation, for example using longer sense time parameter, and when to perform a conventional corrective read operation. The adaptive process can consider the cross-temperature (i.e., write and read temperature differences) as well as the life of the memory device (e.g., the number of program/erase cycles performed). For example, an enhanced corrective read or a corrective read with longer sense time can be beneficial for a high temperature program and low temperature read case. The resulting corrective read can thus be adaptively enhanced without suffering from extensive read time, which would cause latency degradation and raise a risk of time out.

To implement an adaptive enhanced corrective read operation as described herein, a memory sub-system controller can receive a request to perform a read operation on a segment of the memory device. The memory sub-system controller can then determine a program erase cycle count associated with the segment of the memory device and determine a temperature offset value for the segment of the memory device based on a write temperature and a read temperature. For example, the temperature offset value may be a value of the write temperature relative to the read temperature. The memory sub-system controller can then use a threshold criterion to determine a sense time parameter and perform the corrective read operation using the sense time parameter. In one example, the memory sub-system controller can determine whether the temperature offset value satisfies a threshold criterion associated with the program erase cycle count of the segment, and responsive to determining that the temperature offset value satisfies the threshold criterion, perform a corrective read operation on the segment of the memory device, wherein a sense time parameter of the corrective read operation is modified according to the temperature offset value and the program erase cycle count. For example, the threshold criterion may be a predefined threshold value determined based on the program erase cycle count, and the temperature offset value satisfies the threshold criterion when the temperature offset value meets or exceeds the predefined threshold value. In this case, the corrective read operation may be an enhanced corrective read that having a predefined sense time parameter that is larger than that of a normal corrective read. In another example, the memory sub-system controller may determine whether the temperature offset value satisfies a threshold criterion that includes a plurality of predefined ranges determined based on the program erase cycle count, and each predefined range may correspond to a respective sense time parameter. For example, responsive to determining that the temperature offset value falls in a first predefined range, the memory sub-system controller may perform a first corrective read operation on the segment of the memory device, and responsive to determining that the temperature offset value falls in a second predefined range, the memory sub-system controller may perform a second corrective read operation on the segment of the memory device, wherein the first corrective read operation and the second corrective read operation differs with respect to the sense time parameter.

As opposed to the predetermined constant sense time parameter utilized in some implementations of corrective read, each sense time parameter described herein can be determined on-the-fly adaptively. Thus, the adaptive sense time parameter can result in improved read performance. Further details regarding implementing adaptive enhanced corrective reads are described herein below with reference to FIGS. 2-5.

Advantages of the present disclosure include, but are not limited to, improved memory device performance and reliability. For example, implementing adaptive enhanced corrective read can improve read accuracy based on the write and read cross-temperature difference, which reduces read errors, reduces the latency degradation, reduces trigger rate disk, and increases the life of a memory device. In addition, since enhanced corrective read operations, or corrective read operations with longer sense time parameters, are only performed in certain scenarios, the overall latency and quality of service in the memory sub-system are improved.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Pillar, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level memory cells (SLC) can store one bit per memory cell. Other types of memory cells, such as multi-level memory cells (MLCs), triple level memory cells (TLCs), quad-level memory cells (QLCs), and penta-level memory cells (PLCs) can store multiple bits per memory cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

The memory sub-system 110 includes an adaptive enhanced corrective read (AECR) component 113 that can be used to implement the adaptive enhanced corrective read strategies in accordance with embodiments of the present disclosure. In some embodiments, the memory sub-system controller 115 includes at least a portion of the AECR component 113. In some embodiments, the AECR component 113 is part of the host system 110, an application, or an operating system. In other embodiments, local media controller 135 includes at least a portion of AECR component 113 and is configured to perform the functionality described herein.

The AECR component 113 can perform adaptive enhanced corrective read based on chip write and read temperature. To perform an adaptive enhanced corrective read, the AECR component 113 can receive a request to perform a read operation with respect to a set of target cells connected to a target wordline, and, in response to receiving the request (e.g., read command), initiate the read operation via the local media controller 135 to read the set of target cells. The AECR component 113 can determine a program erase cycle count associated with the set of target cells. The AECR component 113 can determine a temperature offset value for the set of target cells based on a write temperature and a read temperature. The AECR component 113 can then determine whether the temperature offset value satisfies a threshold criterion associated with the program erase cycle count of the set of target cells. Thus, the AECR component 113 can then determine a sense time parameter based on the determination for the temperature offset value regarding the threshold criterion associated with the program erase cycle count. The AECR component 113 can then perform a corrective read operation using the determined sense time parameter. Further details regarding the operations of the AECR component 113 will be described below with reference to FIGS. 2-5.

It will be appreciated by those skilled in the art that additional circuitry and signals can be provided, and that the components of FIG. 1 have been simplified. It should be recognized that the functionality of the various block components described with reference to FIG. 1 may not necessarily be segregated to distinct components or component portions of an integrated circuit device. For example, a single component or component portion of an integrated circuit device could be adapted to perform the functionality of more than one block component of FIG. 1. Alternatively, one or more components or component portions of an integrated circuit device could be combined to perform the functionality of a single block component of FIG. 1.

Figure 2:
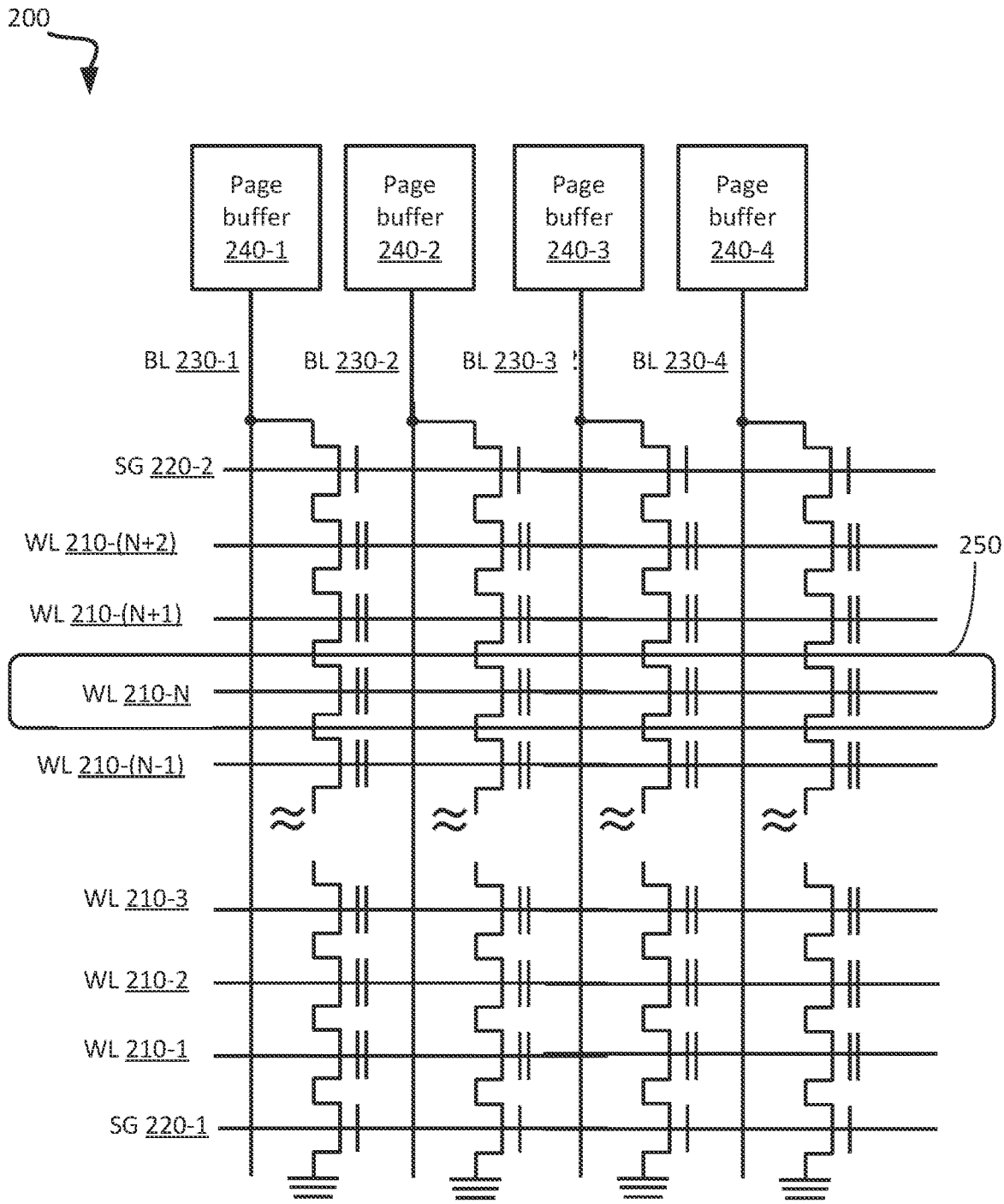
FIG. 2 is a diagram of a portion of a memory device, in accordance with some embodiments of the present disclosure.

FIG. 2 is a diagram of a portion of a memory array 200, in accordance with some embodiments. The memory array 200 can include any suitable number of wordlines (WLs). For example, as shown, the memory array 200 includes a number of wordlines WL 210-1 through WL 210-(N+2). Each of the WLs 210-1 through 210-(N+2) is connected to a respective set of cells. Each of the WLs 210-1 through 210-(N+2) is adjacent to at least one WL. For example, WL 210-(N+1) and WL 210-(N−1) are each adjacent wordlines with respect to WL 210-N. The memory array 200 further includes select gate (SG) 220-1 and SG 220-2 In some embodiments, SG 220-1 is a source-side SG (SGS) and SG 220-2 is a drain-side SG (SGD).

The memory array 200 further includes a number of bitlines (BLs) including BL 230-1 through 230-4 and a number of page buffers including page buffers 240-1 through 240-4. Each of the page buffers is connected to a respective one of the bitlines. Although only 4 bitlines 230-1 through 210-3 and page buffers 240-1 through 240-4 are shown, the memory array 200 can include any suitable number of bitlines and page buffers.

In this illustrative example, a set of target cells 250 is selected to be read. The set of target cells 250 includes a number of cells of the target wordline WL 210-N. Each target cell of the set of target cells 250 is adjacent to a pair of adjacent cells. More specifically, the pair of adjacent cells for a particular target cell includes the cell connected to WL 210-(N+1) that is directly above the target cell, and the cell connected to WL 210-(N−1) that is directly below the target cell. That is, a target cell of the set of target cells 250 is connected to a same one of the bitlines as its respective pair of adjacent cells.

A memory sub-system controller (e.g., AECR component 113 of FIG. 1) may receive a request to initiate a read operation with respect to the set of target cells 250 via a local media controller (e.g., local media controller 135 of FIG. 1). The memory sub-system controller may determine a program erase cycle count associated with the set of target cells 250 and determine a temperature offset value for the set of target cells 250 based on a write temperature and a read temperature. The memory sub-system controller may use a threshold criterion associated with the program erase cycle count and the temperature offset value to determine a sense time parameter that can be used in a corrective read operation. The memory sub-system controller may perform the corrective read operation via the local media controller. Further details regarding performing adaptive enhanced corrective reads are described above with reference to FIG. 1 and will be described in further detail below with reference to FIGS. 3A-5.

FIGS. 3A-3D are flow diagrams of example methods 300A-300D to implement adaptive enhanced corrective reads, in accordance with some embodiments of the present disclosure. The methods 300A-300D can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the methods 300A-300D are performed by the AECR component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

FIGS. 4A-4B are diagrams of examples of threshold criterions for the adaptive enhanced corrective read, in accordance with some embodiments of the present disclosure. Although shown in a particular value or range, the illustrated embodiments should be understood only as examples. FIGS. 3A-3D and FIGS. 4A-4B are described below together.

Figure 3A:
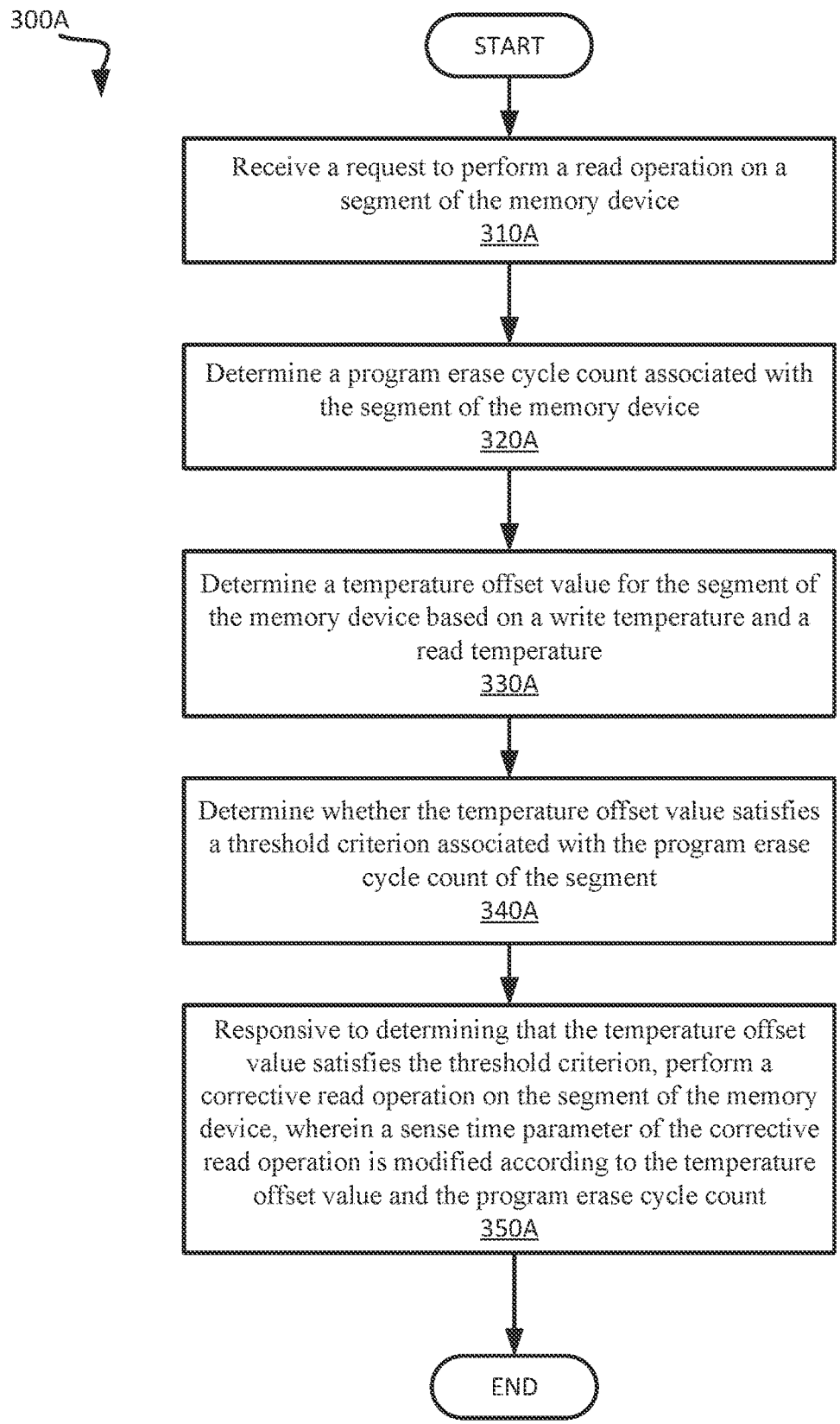
FIGS. 3A-3D are flow diagrams illustrating examples of methods to perform adaptive enhanced corrective read, in accordance with some embodiments of the present disclosure.

Referring now to FIG. 3A, at operation 310A, a request to perform a read operation on a segment of a memory device is received. The segment of the memory device may include one or more units of a memory array of a memory device, such as memory device 130. In one embodiment, the request can be a read command received at a memory sub-system controller (e.g., the memory sub-system controller 115 of FIG. 1). The processing logic may initiate a read operation with respect to a set of target cells in response to receiving the request. In one example, the processing logic may initiate a corrective read operation with respect to a set of target cells in response to receiving a request to perform a corrective read in response to detecting a read error. The request may be initiated as an option in an error-handling flow. The read error may be detected in response to performing a host-initiated read operation or performing a calibration operation.

At operation 320A, a program erase cycle (PEC) count associated with the segment of the memory device is determined. For example, the processing logic may determine the PEC count for a set of target cells. A set of target cells may be defined to have the same PEC count. In one embodiment, memory sub-system controller 115 tracks the PEC count at a certain level of granularity, such as by segment, by memory die, by memory device, etc. Accordingly, AECR component can retrieve the PEC count associated with the segment of the memory device including the target cells, such as from a data structure maintained in local memory 119 or elsewhere on memory device 130.

At operation 330A, a temperature offset value for the segment of the memory device based on a write temperature and a read temperature is determined. For example, the processing logic may determine the write temperature at a time when the request to perform the programming operation is received, and may determine the read temperature at a time when the request to perform the read operation is received. In one embodiment, the processing logic may obtain a temperature measurement value from a temperature sensor on the memory device 130, such as temperature sensor 180 (i.e., an on-die temperature sensor). Depending on the embodiment, the processing logic may either query temperature sensor 180 for a new temperature measurement in response to receiving a request (e.g., the request at operation 310A), or may use a most recently measured temperature value (e.g., when temperature measurements are routinely taken at periodic intervals on memory device 130). In another embodiment, the control logic may receive a temperature measurement value from a temperature sensor external to the memory device, such as a sensor located elsewhere in memory sub-system 110. In one example, the processing logic may determine a temperature offset value for the segment of the memory device by calculating a value (Delta) of the write temperature ($T_{write}$) above the read temperature ($T_{read}$): Delta=$T_{write}$-$T_{read}$.

At operation 340A, it is determined whether the temperature offset value satisfies a threshold criterion associated with the program erase cycle count of the segment. For example, the processing logic may compare the temperature offset value with a threshold value. In one implementation, the temperature offset value satisfies the threshold criterion when the temperature offset value is greater than or equal to the threshold value. In another implementation, the threshold criterion may include a range of values, and the temperature offset value satisfies the threshold criterion when the temperature offset value falls in the range. In yet another implementation, the threshold criteria may include multiple ranges and/or sub-ranges, and the temperature offset value satisfies the threshold criterion when the temperature offset falls in any of the multiple ranges and/or sub-ranges. Further details regarding threshold criterion for the adaptive enhanced corrective reads will be described below with reference to FIGS. 4A-4B.

At operation 350A, responsive to determining that the temperature offset value satisfies the threshold criterion, a corrective read operation on the segment of the memory device is performed, wherein the sense time parameter of the corrective read operation is modified according to the temperature offset value and the program erase cycle count. This indicates that different temperature offset values will be used based on the determination of whether the temperature offset value satisfies the threshold criterion associated with the program erase cycle count.

In one implementation, the corrective read operation is an Enhanced Corrective Read, which has longer sense time than the normal Corrective Read. While normal Corrective Read as described above can mitigate RWB loss due to lateral charge migration, Enhanced Corrective Read applies stronger temperature compensation value depending on the sense time (i.e., tempco_tsense) and longer precharge time (i.e., tprecharge) on top of corrective read, and can improve both data retention and cross-temperature RWB loss, which is specifically targeted for the usage of stacking data retention (normal charge loss) and cross-temperature cases. tempco_tsense is a temperature coefficient related to tsense, for example at 70° C. tsense has a value of 2 µs, at 30° C. tsense has a value of 2.5 µs, then tempco_tsense has a value of 0.5 µs/40° C. tprecharge is a coefficient related to precharge timing during program verify and read operations. Because of longer tsense/tprecharge, Enhanced Corrective Read have longer corrective read time and may cause latency degradation and raise a risk of time out. The present disclosure provides an adaptive way to perform selectively between Corrective Read and Enhanced Corrective Read that can optimally take advantages of both Corrective Read and Enhanced Corrective Read while considering the cross-temperature effects. In one example, Enhanced Corrective Read is performed only for a high temperature program and low temperature read situation.

In another implement, the corrective read operation is a corrective read operation with longer sense time. In yet another implement, the corrective read operation includes multiple corrective read operations each with respective sense time. Performing a corrective read operation for the set of target cells using the respective sense time parameter can lead to reduced error rates and improved memory device performance.

Figure 3B:
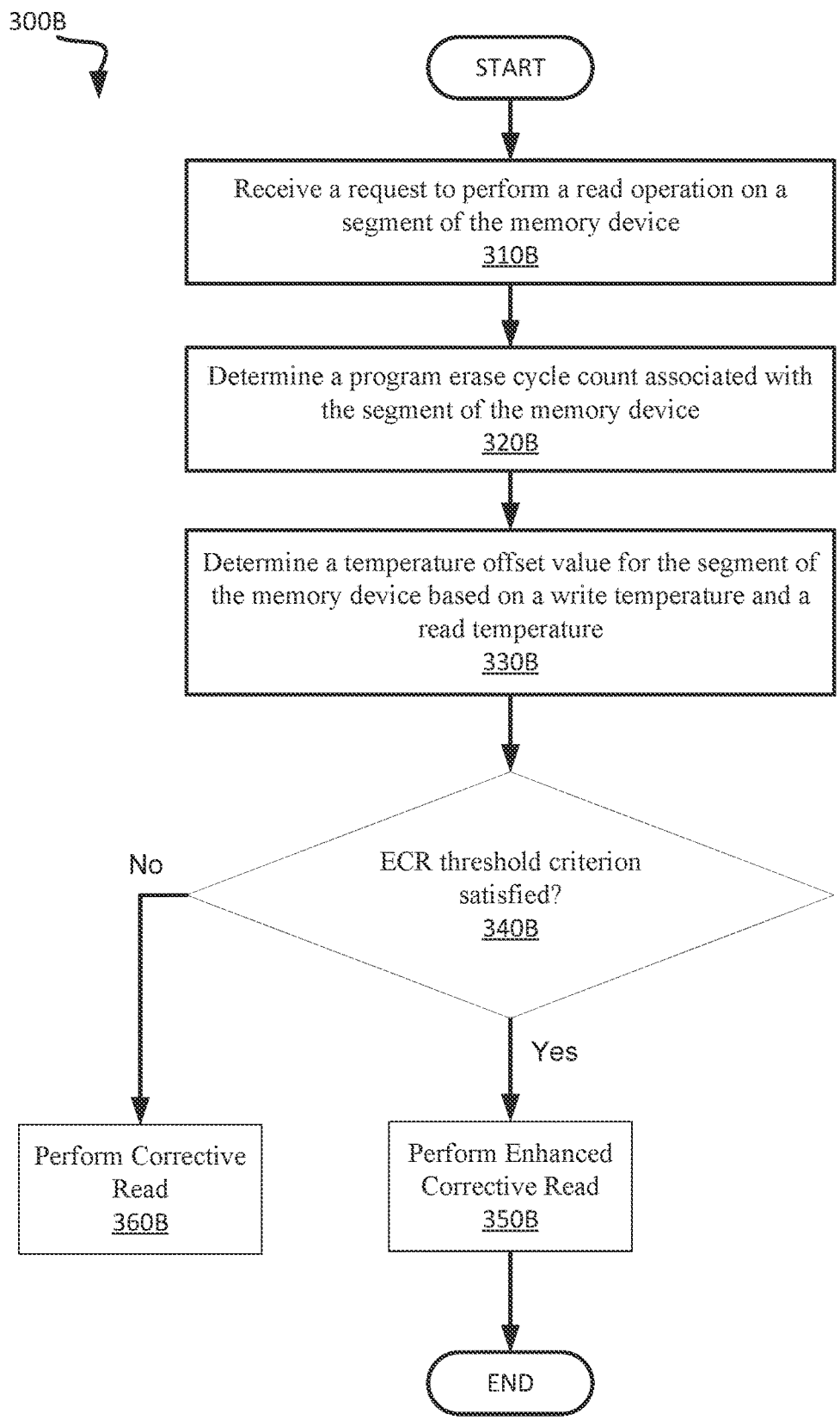

Referring now to FIG. 3B, at operation 310B, a request to perform a read operation on a segment of a memory device is received, which may be same as or similar to operation 310A. At operation 320B, a program erase cycle (PEC) count associated with the segment of the memory device is determined, which may be same as or similar to operation 320A. At operation 330B, a temperature offset value for the segment of the memory device based on a write temperature and a read temperature is determined, which may be same as or similar to operation 330A.

At operation 340B, it is determined whether the temperature offset value satisfies an Enhanced Corrective Read (ECR) threshold criterion associated with the program erase cycle count of the segment. For example, the processing logic may compare the temperature offset value with an ECR threshold value. In one implementation, the temperature offset value satisfies the ECR threshold criterion when the temperature offset value is greater than or equal to the ECR threshold value. Now referring to FIG. 4A, for example, A1 may be 0.5K and T1 may be 30° C., that is, when a PEC count is 0.5K, the ECR threshold value is 30° C.; A2 may be 1K and T2 may be 20° C., that is, when a PEC count is 1K, the ECR threshold value is 20° C.; and A3 may be 1.5K and T3 may be 15° C., that is, when a PEC count is 1.5K, the ECR threshold value is 15° C.

At operation 350B, responsive to determining that the temperature offset value satisfies the ECR threshold criterion, an Enhanced Corrective Read operation on the segment of the memory device is performed, wherein the sense time parameter of the corrective read operation is modified according to the temperature offset value and the program erase cycle count compared with the normal Corrective Read. At operation 360B, responsive to determining that the temperature offset value does not satisfy the ECR threshold criterion, a normal Corrective Read operation on the segment of the memory device is performed. This process differentiate with traditional operation in which Enhanced Corrective Read can be turned either on or off but cannot apply adaptively with program-read temperature difference and the number of program erase cycles performed on the cell. Performing a corrective read operation for the set of target cells using the respective sense time parameter of Corrective Read or Enhanced Corrective Read can lead to reduced error rates and improved memory device performance.

Referring now to FIG. 4A, in the example described above, when a PEC count is 0.5K, the ECR threshold value is 30° C.; if the temperature offset value (e.g., Delta=$T_{write}$-$T_{read}$) is larger than or equals to 30° C., Enhanced Corrective Read will be performed; and if the temperature offset value (e.g., Delta=$T_{write}$-$T_{read}$) is smaller than 30° C., normal Corrective Read will be performed. As another example, when a PEC count is 1K, the ECR threshold value is 20° C.; if the temperature offset value (e.g., Delta=$T_{write}$-$T_{read}$) is larger than or equals to 20° C., Enhanced Corrective Read will be performed; and if the temperature offset value (e.g., Delta=$T_{write}$-$T_{read}$) is smaller than 20° C., normal Corrective Read will be performed. As yet another example, when a PEC count is 1K, the ECR threshold value is 15° C.; if the temperature offset value (e.g., Delta=$T_{write}$-$T_{read}$) is larger than or equals to 15° C., Enhanced Corrective Read will be performed; and if the temperature offset value (e.g., Delta=$T_{write}$-$T_{read}$) is smaller than 15° C., normal Corrective Read will be performed.

Figure 3C:
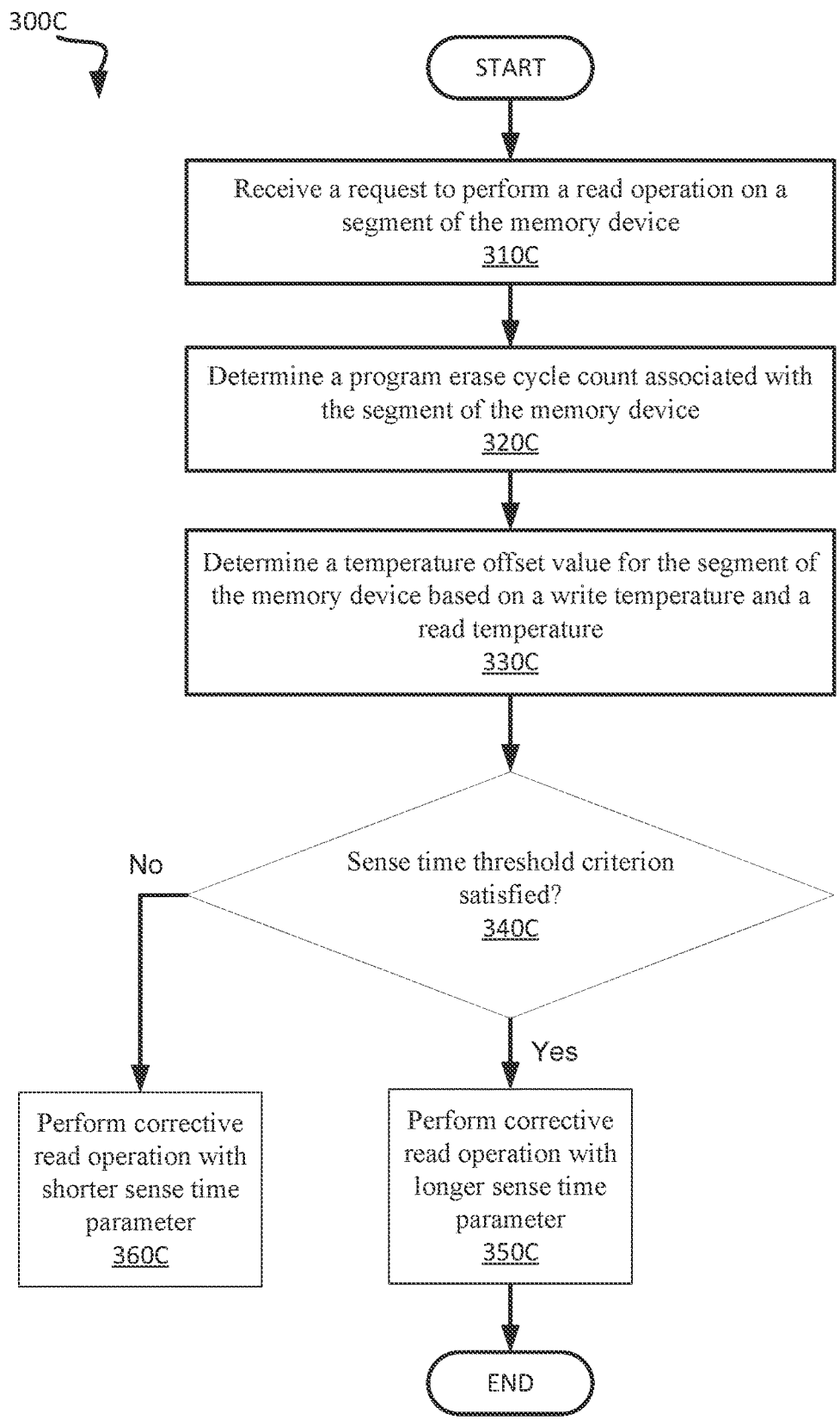

Referring now to FIG. 3C, at operation 310C, a request to perform a read operation on a segment of a memory device is received, which may be same as or similar to operation 310A. At operation 320C, a program erase cycle (PEC) count associated with the segment of the memory device is determined, which may be same as or similar to operation 320A. At operation 330C, a temperature offset value for the segment of the memory device based on a write temperature and a read temperature is determined, which may be same as or similar to operation 330A.

At operation 340C, it is determined whether the temperature offset value satisfies a sense time threshold criterion associated with the program erase cycle count of the segment. For example, the processing logic may compare the temperature offset value with one or more sense time threshold ranges and/or sub-ranges. In one implementation, the temperature offset value satisfies the sense time threshold value when the temperature offset value falls in a sense time threshold range. In another implementation, the temperature offset value satisfies the sense time threshold criterion when the temperature offset falls in any of the sense time threshold ranges and/or sub-ranges. Now referring to FIG. 4B, for example, B1 may be 0.5K, T11 may be 30° C., T12 may be 40° C., and T13 may be 50° C., that is, when a PEC count is 0.5K, the sense time threshold ranges include a range below 30° C., a range between 30° C. (including 30° C.) and 40° C., a range between 40° C. (including 40° C.) and 50° C., and a range above 50° C. (including 50° C.). In another example, B2 may be 1K, T21 may be 20° C., T22 may be 30° C., and T23 may be ° C., that is, when a PEC count is 1K, the sense time threshold ranges include a range below 20° C., a range between 20° C. (including 20° C.) and 30° C., a range between 30° C. (including 30° C.) and 40° C., and a range above 40° C. (including 40° C.). In yet another example, B3 may be 1.5K, T31 may be 10° C., T32 may be 20° C., and T33 may be 30° C., that is, when a PEC count is 1.5K, the sense time threshold ranges include a range below 10° C., a range between 10° C. (including ° C.) and 20° C., a range between 20° C. (including 20° C.) and 30° C., and a range above 30° C. (including 30° C.).

At operation 350C, responsive to determining that the temperature offset value satisfies the sense time threshold criterion, a corrective read operation with longer sense time parameter on the segment of the memory device is performed, wherein the sense time parameter of the corrective read operation is modified according to the temperature offset value and the program erase cycle count. At operation 360C, responsive to determining that the temperature offset value does not satisfy the sense time threshold criterion, a corrective read operation with shorter sense time parameter on the segment of the memory device is performed. This process allow corrective read operation to be applied adaptively with program-read temperature difference and the number of program erase cycles performed on the cell using respective sense time parameter. Performing a corrective read operation for the set of target cells using the respective sense time parameter can lead to reduced error rates and improved memory device performance.

Now referring to FIG. 4B, in the example described above, when a PEC count is 0.5K, the sense time threshold ranges include a range below 30° C., a range between 30° C. (including 30° C.) and 40° C., a range between 40° C. (including 40° C.) and 50° C., and a range above 50° C. (including 50° C.). If the temperature offset value (e.g., Delta=$T_{write}$-$T_{read}$) falls in the range below 30° C. (e.g., Delta<30° C.), the corrective read operation with "X1" sense time (tSense) will be performed. If the temperature offset value (e.g., Delta=$T_{write}$-$T_{read}$) falls in the range between 30° C. (including 30° C.) and 40° C. (e.g., 30° C.<Delta<40° C.), the corrective read operation with "X2" sense time (tSense) will be performed. If the temperature offset value (e.g., Delta=$T_{write}$-$T_{read}$) falls in the range between 40° C. (including 40° C.) and 50° C. (e.g., 40° C.<Delta<50° C.), the corrective read operation with "X3" sense time (tSense) will be performed. If the temperature offset value (e.g., Delta=$T_{write}$-$T_{read}$) falls in the range above 50° C. (including 50° C.) (e.g., Delta>50° C.), the corrective read operation with "X4" sense time (tSense) will be performed. For example, X1, X2, X3, X4 may be in a range of 1.5 µs to 2.5 µs.

In another example described above, when a PEC count is 1K, the sense time threshold ranges include a range below 20° C., a range between 20° C. (including 20° C.) and 30° C., a range between 30° C. (including 30° C.) and 40° C., and a range above 40° C. (including 40° C.). If the temperature offset value (e.g., Delta=$T_{write}$-$T_{read}$) falls in the range below 20° C. (e.g., Delta<20° C.), the corrective read operation with "Y1" sense time (tSense) will be performed. If the temperature offset value (e.g., Delta=$T_{write}$-$T_{read}$) falls in the range between 20° C. (including 20° C.) and 30° C. (e.g., 20° C.<Delta<30° C.), the corrective read operation with "Y2" sense time (tSense) will be performed. If the temperature offset value (e.g., Delta=$T_{write}$-$T_{read}$) falls in the range between 30° C. (including 30° C.) and 40° C. (e.g., 30° C.<Delta<40° C.), the corrective read operation with "Y3" sense time (tSense) will be performed. If the temperature offset value (e.g., Delta=$T_{write}$-$T_{read}$) falls in the range above 40° C. (including 40° C.) (e.g., Delta>40° C.), the corrective read operation with "Y4" sense time (tSense) will be performed. For example, Y1, Y2, Y3, Y4 may be in a range of 2.0 µs to 3.0 µs.

In yet another example described above, when a PEC count is 1.5K, the sense time threshold ranges include a range below 10° C., a range between 10° C. (including 10° C.) and 20° C., a range between 20° C. (including 20° C.) and 30° C., and a range above 30° C. (including 30° C.). If the temperature offset value (e.g., Delta=$T_{write}$-$T_{read}$) falls in the range below 10° C. (e.g., Delta<10° C.), the corrective read operation with "Z1" sense time (tSense) will be performed. If the temperature offset value (e.g., Delta=$T_{write}$-$T_{read}$) falls in the range between 10° C. (including 10° C.) and 20° C. (e.g., 10° C.<Delta<20° C.), the corrective read operation with "Z2" sense time (tSense) will be performed. If the temperature offset value (e.g., Delta=$T_{write}$-$T_{read}$) falls in the range between 20° C. (including 20° C.) and 30° C. (e.g., 20° C.<Delta<30° C.), the corrective read operation with "Z3" sense time (tSense) will be performed. If the temperature offset value (e.g., Delta=$T_{write}$-$T_{read}$) falls in the range above 30° C. (including 30° C.) (e.g., Delta>30° C.), the corrective read operation with "Z4" sense time (tSense) will be performed. For example, Z1, Z2, Z3, Z4 may be in a range of 2.5 µs to 3.5 µs.

Figure 3D:
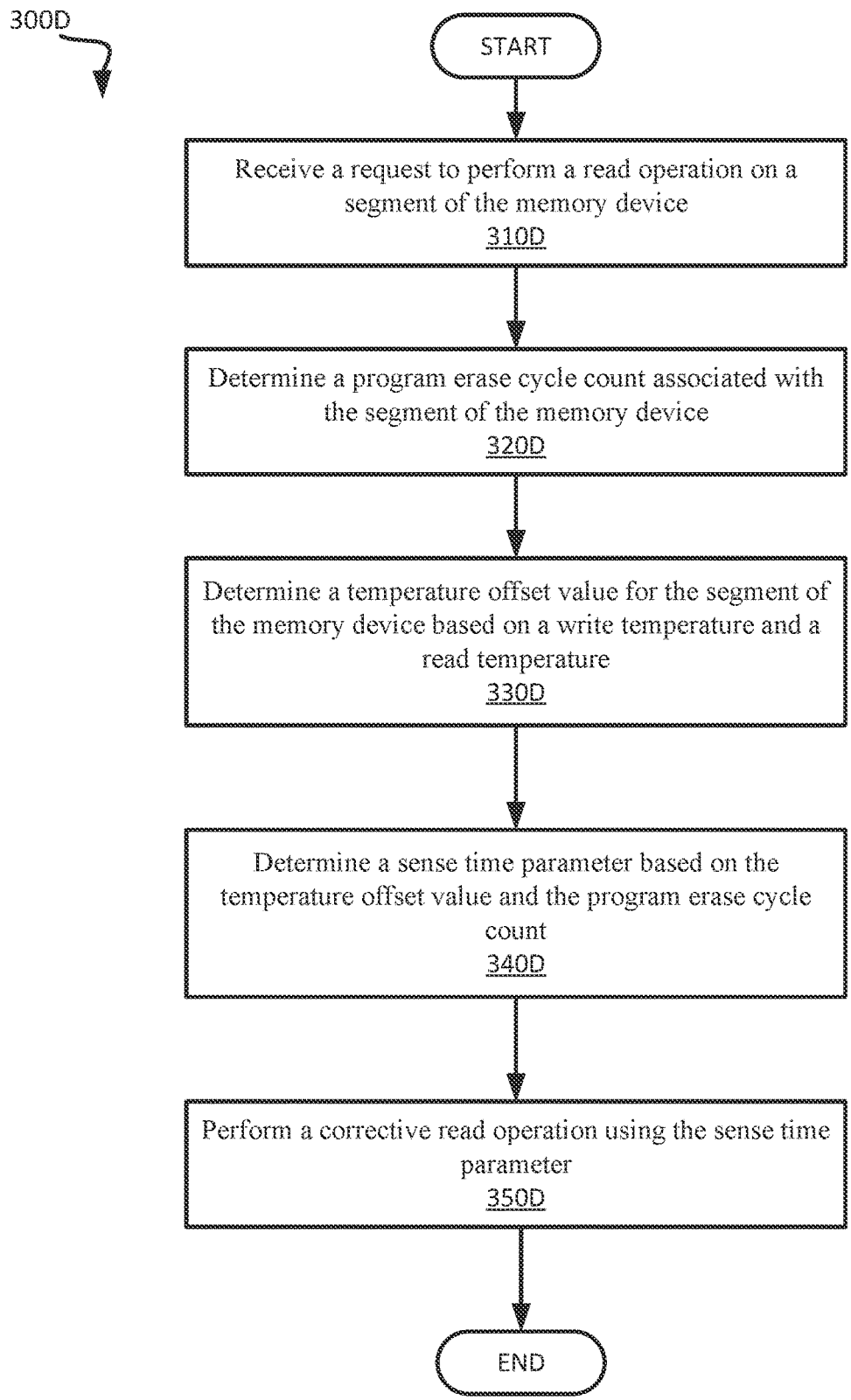

Referring now to FIG. 3D, at operation 310D, a request to perform a read operation on a segment of a memory device is received, which may be same as or similar to operation 310A. At operation 320D, a program erase cycle (PEC) count associated with the segment of the memory device is determined, which may be same as or similar to operation 320A. At operation 330D, a temperature offset value for the segment of the memory device based on a write temperature and a read temperature is determined, which may be same as or similar to operation 330A.

At operation 340D, a sense time parameter based on the temperature offset value and the program erase cycle count is determined. In one implementation, the sense time parameter may be determined via a look-up table that is predefined. For example, the look-up table may be provided, including a temperature offset value and a program erase cycle count, together corresponding to a respective sense time parameter. In another example, the look-up table may be provided, including a range of the temperature offset value and a range of the program erase cycle count, together corresponding to a respective sense time parameter. In yet another example, the look-up table may be provided, including a program erase cycle count and a range of the temperature offset value, together corresponding to a respective sense time parameter, such as FIG. 4B. In yet another example, the look-up table may be provided, including a temperature offset value and a range of a program erase cycle count, together corresponding to a respective sense time parameter. In other implementations, the sense time parameter may be determined via a threshold criterion in any data structure form.

At operation 350D, responsive to determining the sense time parameter, a corrective read operation using the sense time parameter on the segment of the memory device is performed. Performing a corrective read operation for the set of target cells using the respective sense time parameter can lead to reduced error rates and improved memory device performance.

Figure 5:
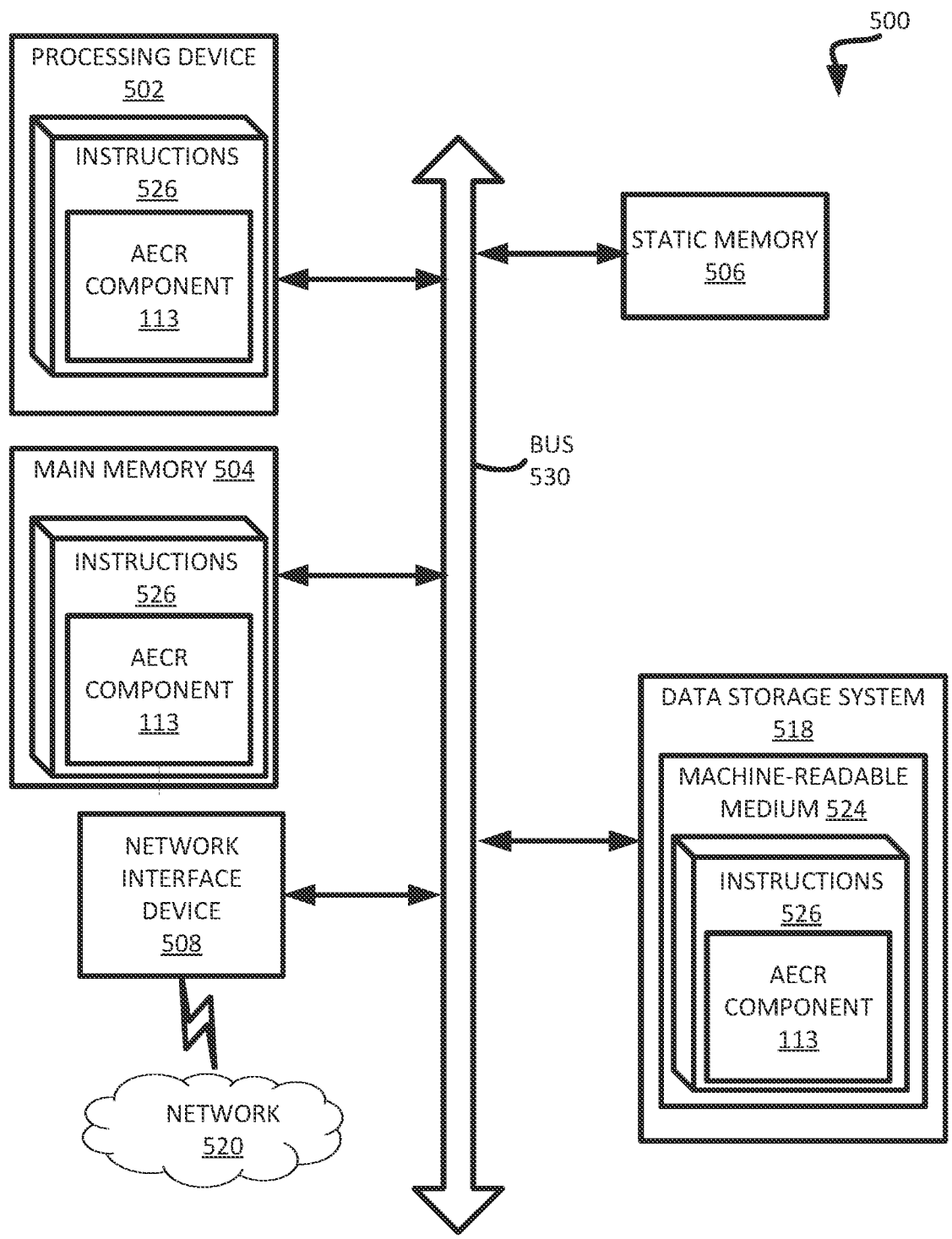
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the AECR component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a memory cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or RDRAM, etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a component (e.g., the AECR component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:
1. A system comprising:
a memory device; and
a processing device, operatively coupled with the memory device, to perform operations comprising:

receiving a request to perform a read operation on a segment of the memory device;
determining a program erase cycle count associated with the segment of the memory device;
determining a temperature offset value for the segment of the memory device based on a write temperature and a read temperature,
determining whether the temperature offset value satisfies a threshold criterion determined based on the program erase cycle count of the segment; and
responsive to determining that the temperature offset value satisfies the threshold criterion, performing a corrective read operation on the segment of the memory device, wherein a sense time parameter of the corrective read operation is modified according to the temperature offset value and the program erase cycle count.

2. The system of claim 1, wherein the processing device is to perform operations further comprising:
determining the temperature offset value as a value by which the write temperature exceeds the read temperature.

3. The system of claim 1, wherein the temperature offset value satisfies the threshold criterion when the temperature offset value meets or exceeds a predefined threshold value, and wherein the predefined threshold value is determined based on the program erase cycle count.

4. The system of claim 3, wherein the corrective read operation comprises an Enhanced Corrective Read, and wherein the sense time parameter of the Enhanced Corrective Read has a value exceeding that of the sense time parameter of a Corrective Read.

5. The system of claim 4, wherein the processing device to perform operations further comprising:
responsive to determining that the temperature offset value does not satisfy the threshold criterion, performing the Corrective Read on the segment of the memory device using a default sense time parameter.

6. The system of claim 1, wherein the temperature offset value satisfies the threshold criterion when the temperature offset value falls in one of a plurality of predefined ranges, and wherein the plurality of predefined ranges is determined based on the program erase cycle count.

7. The system of claim 6, wherein the sense time parameter of the corrective read operation is modified according to the respective predefined range in which the temperature offset value falls.

8. The system of claim 1, wherein the temperature offset value satisfies the threshold criterion when the temperature offset value falls in a predefined first range or a predefined second range, and wherein the predefined first range and the predefined second range are determined based on the program erase cycle count.

9. The system of claim 8, wherein performing the corrective read operation further comprises:
responsive to determining that the temperature offset value falls in the predefined first range, performing a first corrective read operation on the segment of the memory device; and
responsive to determining that the temperature offset value falls in the predefined second range, performing a second corrective read operation on the segment of the memory device,
wherein the first corrective read operation and the second corrective read operation utilize different sense time parameters.

10. A method comprising:
receiving a request to perform a read operation on a segment of a memory device;
determining a program erase cycle count associated with the segment of the memory device;
determining a temperature offset value for the segment of the memory device based on a write temperature and a read temperature,
determining whether the temperature offset value satisfies a threshold criterion determined based on the program erase cycle count of the segment; and
responsive to determining that the temperature offset value satisfies the threshold criterion, performing a corrective read operation on the segment of the memory device, wherein a sense time parameter of the corrective read operation is determined based on the determination that the temperature offset value satisfies the threshold criterion associated with the program erase cycle count of the segment.

11. The method of claim 10, further comprising:
determining the temperature offset value as a value by which the write temperature exceeds the read temperature.

12. The method of claim 10, wherein the temperature offset value satisfies the threshold criterion when the temperature offset value meets or exceeds a predefined threshold value, and wherein the predefined threshold value is determined based on the program erase cycle count; and
wherein the corrective read operation comprises an Enhanced Corrective Read, and wherein the sense time parameter of the Enhanced Corrective Read has a value exceeding that of the sense time parameter of a Corrective Read.

13. The method of claim 12, further comprising:
responsive to determining that the temperature offset value does not satisfy the threshold criterion, performing the Corrective Read on the segment of the memory device using a default sense time parameter.

14. The method of claim 10, wherein the temperature offset value satisfies the threshold criterion when the temperature offset value falls in one of a plurality of predefined ranges, and wherein the plurality of predefined ranges is determined based on the program erase cycle count; and
wherein the sense time parameter of the corrective read operation is modified according to the respective predefined range in which the temperature offset value falls.

15. A non-transitory computer-readable storage medium comprising instructions that, when executed by a processing device, cause the processing device to perform operations comprising:
receiving a request to perform a read operation on a segment of a memory device;
determining a program erase cycle count associated with the segment of the memory device;
determining a temperature offset value for the segment of the memory device based on a write temperature and a read temperature,
determining a sense time parameter based on the temperature offset value and the program erase cycle count, wherein determining the sense time parameter further comprises determining whet et the temperature value satisfies a threshold criterion determined based on the program erase cycle count of the segment; and
performing a corrective read operation using the sense time parameter.

16. The non-transitory computer-readable storage medium of claim 15, wherein determining the temperature offset value further comprises calculating a value by which the write temperature exceeds the read temperature.

17. The non-transitory computer-readable storage medium of claim 16, wherein determining the sense time parameter further comprises determining the sense time parameter according to whether the temperature offset value meets or exceeds a predefined threshold value, and wherein the predefined threshold value is determined based on the program erase cycle count.

18. The non-transitory computer-readable storage medium of claim 17, further comprising:
   determining the sense time parameter as a sense time parameter of an Enhanced Corrective Read when the temperature offset value meets or exceeds the predefined threshold value; and
   determining the sense time parameter as a sense time parameter of a Corrective Read when the temperature offset value neither meets nor exceeds the predefined threshold value.

19. The non-transitory computer-readable storage medium of claim 15, wherein determining the sense time parameter further comprises determining the sense time parameter according to a predefined look-up table, wherein the predefined look-up table provides a respective sense time parameter for the temperature offset value that falls in a range among a plurality of ranges, and wherein the plurality of ranges is determined based on the program erase cycle count.

20. The non-transitory computer-readable storage medium of claim 19, wherein the predefined look-up table provides, for a same program erase cycle count, the sense time parameter being proportional to the range in which the temperature offset value falls.

* * * * *